United States Patent Office 3,448,442
Patented June 3, 1969

3,448,442
METHOD AND APPARATUS FOR DETECTING WATERFLOW INCLUDING A NON-INSTANTANEOUSLY RECYCLING RETARD ELEMENT
Arthur B. Hube, Huntington Station, N.Y., assignor to American District Telegraph Company, Jersey City, N.J., a corporation of New Jersey
Filed Apr. 30, 1965, Ser. No. 452,281
Int. Cl. G08b 21/00; H01h 35/40, 47/18
U.S. Cl. 340—239                    7 Claims

ABSTRACT OF THE DISCLOSURE

An alarm system of the waterflow detection type for producing a warning signal when water flows in the conduits of an automatic fire sprinkler system. The system employs flow detection devices mounted in communication with the water in a sprinkler system and arranged to produce a mechanical motion output upon a flow of the water within the system. The output is applied to an energy absorbing system which retards absorption of the output and redelivers the output at a retarded rate upon cessation of the output. The quantity of energy stored in the absorption system is continuously measured and an alarm is produced when a predetermined level is exceeded.

---

The present invention relates to fire alarms and more particularly to a method and apparatus of signalling in a fire alarm system of the waterflow type.

The automatic sprinkler systems used for the protection of property against fire are commonly provided with waterflow detectors and an electrical alarm system for providing a warning signal when water flows in the conduits of the system. Normally, a flow of water in the system is interpreted as meaning that a fire has fused one or more sprinkler heads and that the system is functioning as intended to control the fire. On the other hand, water may flow as the result of a broken pipe or sprinkler head, general system leakage or an open test drain. Whatever the cause, it is important that a flow of water in the system be promptly detected and reliably reported via the electrical alarm system to avoid fire and/or water damage to the property and to ensure that necessary repairs may be made to a damaged system so that it will function properly when needed.

The waterflow detectors employed are usually of either the vane type or the pressure type. The vane type consists of a paddle-like vane inserted in the main conduit of the sprinkler system in such manner that a flow of water therethrough will displace the vane from the normal position and the resulting mechanical motion is employed to initiate the transmission of an electrical alarm signal. The pressure type of flow detector is designed to receive water at the supply system pressure from the clapper seat of the check valve when flow begins in the sprinkler system and, through the extension of a bellows or equivalent mechanism, intiate the alarm signal transmission. Regardless of the type of detector employed, it is common practice for economy reasons to connect several detectors supervising different portions of the sprinkler system to a common transmitting device which will initiate a coded electrical signal upon actuation of any of the associated detectors. The coded signals are received at a central station or other control center where trained personnel are always on duty to take such remedial action as is appropriate under the circumstances.

Long experience with hydraulic systems of the type used with automatic sprinkler installations has revealed them to be subject to disturbances in the form of pressure surges or water hammer which create flow-like conditions within the system and produce false alarm signals regardless of the type of detector employed. Such disturbances are usually of short duration, consequently it has become common practice to provide the alarm system with a retarded response feature whereby signals are not initiated until the detected disturbance has persisted long enough to be considered a genuine flow of water in the system. The retard period, which may be on the order of thirty to sixty seconds, is selected to be of slightly greater duration than the longest sugre expected in a particular system and may be used in conjunction with the individual detection devices, the common transmitter or, in unusual cases, on both the detectors and the transmitter. As the duration of the retard period is increased, there is obviously less chance of false signals being generated by pressure surges. But long retard periods may dangerously delay the transmission of a genuine alarm signal, thus good judgement is always necessary when selecting the amount of retard for a particular installation.

The selection of the proper retard period is made the more difficult by two further considerations. One is the fact that almost all fires are small at their beginning and consequently only one or two sprinkler heads will be fused. Water will start to flow in the sprinkler conduits and the detection device will trip the retard mechanism to begin the retard period. However, due to the relatively small flow of water through only one or two open heads, and this is particularly true of extensive sprinkler systems having many heads, the flow in the main conduit may be intermittent. And the result of an interruption in the flow is that the detection device will restore to the normal condition.

The other consideration in the selection of proper retard periods is a basic characteristic of retard mechanisms. Many kinds of retard mechanisms have been used in the past including hydraulic, pneumatic, thermal and electrical (condenser) devices. But these devices have been of the instantly recycling type; that is, any interruption (such as that which generally will follow a surge) in the flow condition that has started the device will cause the mechanism to return swiftly to the initial position. Therefore, when flow resumes a moment later, the retard period must start from the beginning again. It is therefore obvious that a repeated series of interruptions in the flow of water will dangerously delay the ultimate transmission of the alarm signal. In the extreme case, the combination of the sprinkler system characteristics and the flow conditions may be such as to cause repeated oscillations of the detector vane or the check valve clapper, a condition known as "fanning," which will prevent the initiation of the alarm signal indefinitely.

It is obviously desirable that a means be provided for bridging momentary interruptions in water flow that unduly delay alarm signal transmission by causing the retard mechanism to start the cycle anew and one such means is the subject of United States Patent No. 2,880,808, issued Apr. 7, 1959 to Arthur B. Hube. In that patent the transmitter of the alarm system is provided with a retard mechanism and each detection device is provided with a fast-to-make, slow-to-brake switch. When a waterflow is detected, the fast-to-make action of the switch quickly starts the retard mechanism of the transmitter but; if the flow is then interrupted, the slow-to-break feature prevents such interruption from affecting the retard mechanism for a period of time. Thus, if the interruptions are brief, the transmitter retard mechanism proceeds continuously to the alarm point. If the interruption is prolonged, or in other words if the flow condition detected were a momentary pressure surge rather than a genuine flow of water, then the slow-to-break feature will cause the retard mechanism of the transmitter to recycle to the starting position and the entire signaling system is restored to the normal condition.

The system, however, proved cumbersome and expensive in that specially designed mercury tilt switches were required to obtain the fast-to-make, slow-to-break action and difficulty was encountered in determining the proper duration period for the slow-to-break feature. Consequently, it has been a principal object of the present invention to provide a novel method and apparatus for retarding the signal transmissions from a waterflow alarm system.

As hereinbefore mentioned, the signal retarding mechanisms have been of the type that instantaneously restore to the initial position upon an interruption in the flow of water. However, instantaneously recycling retard mechanisms may cause dangerously long delays in the transmission of alarm signals under fluctuating water-flow conditions. Thus, to obviate such danger, the retard periods are made of less duration than are truly desirable with a consequent increase in the number of false alarms caused by pressure surges. It has therefore been an additional object of the present invention to provide a method and apparatus for the retardation of water-flow alarm systems which permits the use of relatively long periods without incurring the risk of failure to signal an alarm under fluctuating water-flow conditions.

A special feature of the method of the invention is that it is readily applicable to any type of retard mechanism, be it pneumatic, hydraulic, thermal or electrical in principle of operation.

In accordance with the present invention, each of the several water-flow detection devices connected to a common transmitter for the initiation of alarm signals upon the occurrence of a flow of water in an automatic sprinkler system are provided with a retard mechanism of the noninstantaneously recycling type. That is to say, the method of operation of the retard mechanism is such, that upon an interruption after the period has begun, the mechanism returns slowly toward the starting position rather than swiftly as is the case with the instantaneously recycling type. Therefore, when flow is resumed a moment later, the retard mechanism picks up from some intermediate point of its time period rather than starting anew from the beginning. As a consequence, the method of the present invention avoids excessive prolongation of the retard period under fluctuating flow conditions which may dangerously delay the initiation of the alarm signal.

Still further objects, features and advantages of the present invention will be apparent from the following description of the application of the method to water-flow detectors of both the vane type and the pressure type and the accompanying drawings in which FIG. 1 is an illustration of the various elements comprising a water-flow alarm signal system and the manner of connection to an automatic sprinkler system;

The signaling system

Figure 1:
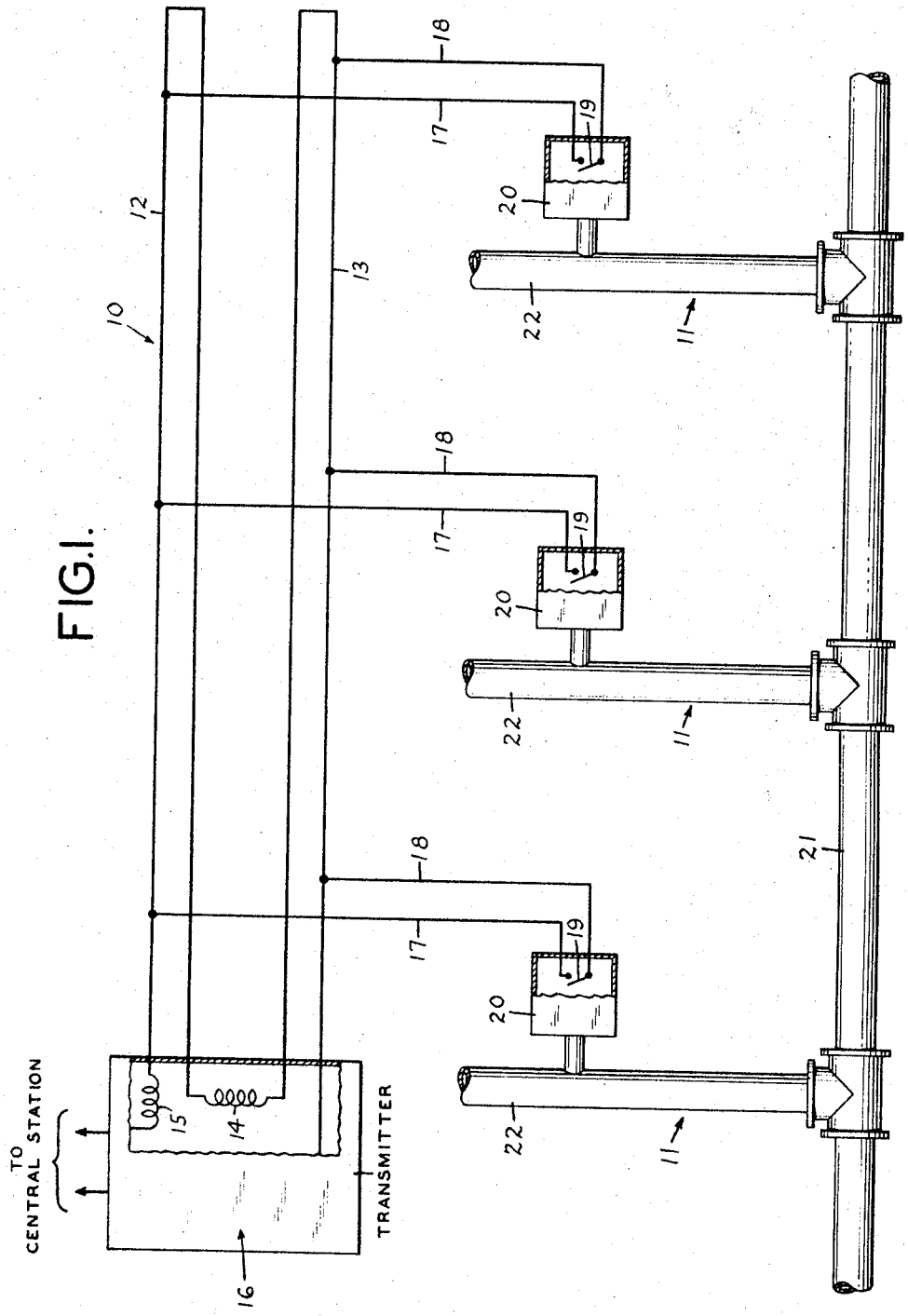

Referring now to FIG. 1, an electrical network generally designated by the reference numeral 10 is of the type which may be installed in conjunction with a group of automatic sprinkler systems 11. The network 10 includes two loop circuits 12 and 13 connected in series with an interposed impedance element 14 and an alarm relay whose winding is shown at 15. Current from a source (not shown) flows through the loops 12 and 13 and is limited by the impedance element 14 to a value insufficient to operate the relay 15. The impedance element 14 and relay 15 are located at a transmitter 16, and, when relay 15 is operated as explained hereinafter, the transmitter is caused to generate a coded electrical signal which is transmitted to a central station or other control center by means well-known in the art.

Loop circuits 12 and 13 are interconnected by a number of pairs of conductors 17 and 18 which lead to the opposite sides of the normally open contacts 19 provided in each water-flow detector 20.

A water supply main 21 is connected by risers 22 to a number of sprinkler systems 11 each having automatic sprinkler heads (not shown). The risers 22 are each equipped with a water-flow detector 20. In a large installation, there may be more than three risers and each may not be provided with a detector, the arrangement of FIG. 1 being intended for illustrative purposes rather than as a diagram of an actual installation.

When water flows in a riser by reason of an open sprinkler head or other cause, the corresponding detector 20, be it of either the vane type or pressure type, functions as described in detail hereinafter, to close the corresponding contact 19. The closure of any of the contacts 19 shunts the impedance element 14 and the resultant increase in current through network 10 is sufficient to operate relay 15 and release the desired coded alarm signal from transmitter 16.

Vane-type detector

Figure 2:
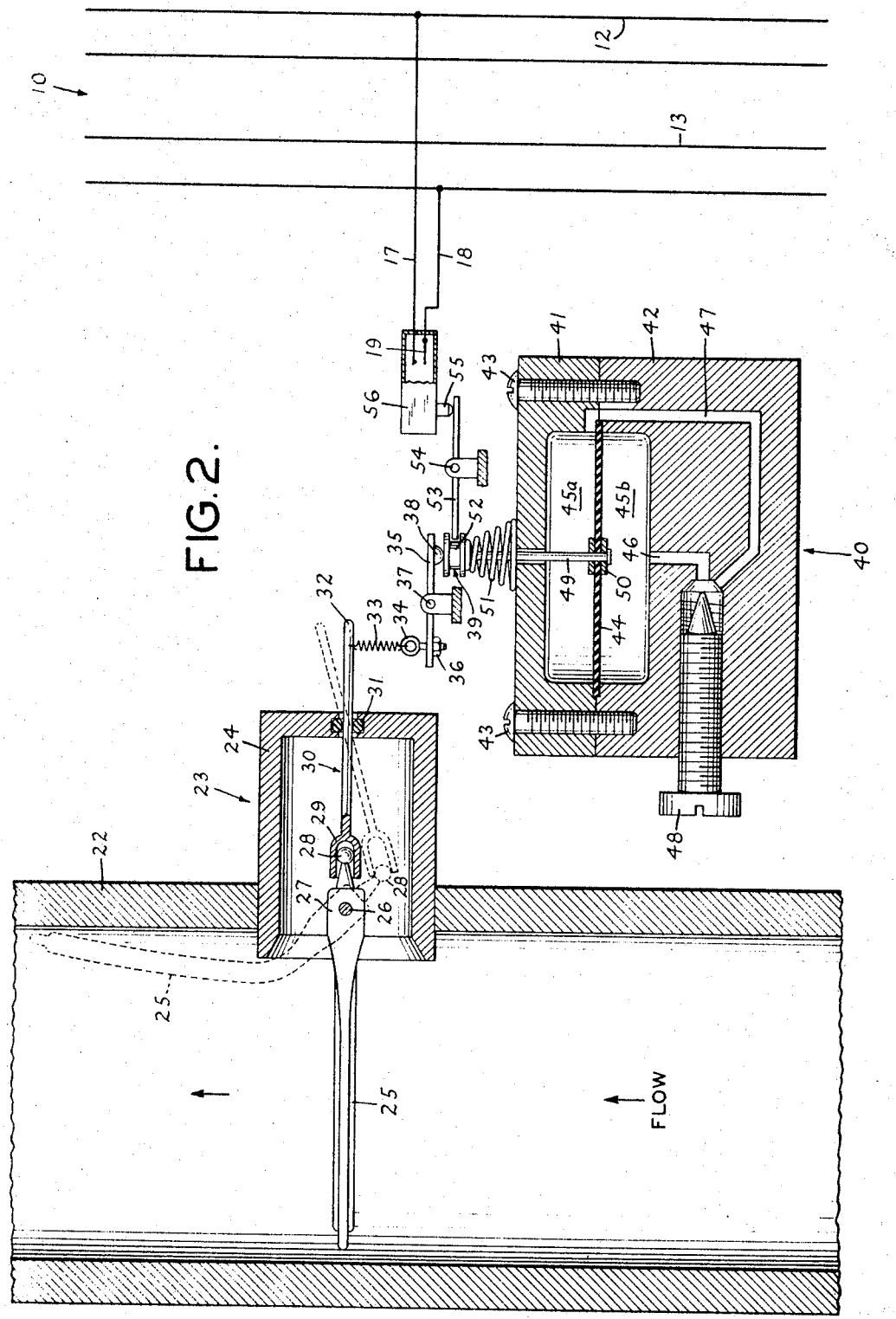
FIG. 2 is a cross-sectional view, partially schematic, of a vane type water-flow detector and the associated retard mechanism embodying the invention.

FIG. 2 shows a vane type water-flow detector 23 installed in a riser 22. The detector 23 may be constructed and installed as set forth in U.S. Patent No. 2,966,133 issued Dec. 27, 1960 to Arthur B. Hube. The representation of the detector in FIG. 2, however, has been simplified by the omission of various parts to clarify the drawing and such modifications have been made as are necessary to accommodate the present invention.

A detector housing 24 is mounted in an opening in the wall of riser 22 by means of a U-bolt clamp (not shown). A flexible vane 25 preferably constructed of a molded plastic material, having a specific gravity as close to that of water as possible so that the vane will be essentially weightless, is pivotally mounted within the housing 24 on a pin 26 passing through a hub portion 27 of vane 25 and is supported at each end by the walls of housing 24. The hub 27 terminates in a spherical portion 28 designed to interiorly engage cup 29 mounted on the proximate end of an operating stem 30. Operating stem 30 is supported in housing 24 by an O-ring 31 which acts as a pivot bearing for stem 30 and also serves as a water seal. Other structural parts required to support O-ring 31 and to effect proper sealing against leakage have been omitted for simplicity but are shown in detail in the aforementioned U.S. Patent No. 2,966,133.

The portion of operating stem 30 extending outside housing 24 is joined at 32 to one end of a linkage spring 33. The other end of spring 33 is connected by means of an eye-bolt 34 to one end of an actuator arm 35. The eye-bolt 34 passes through a clearance hole provided in arm 35 and is secured on the far side by a nut 36 thus providing a degree of adjustment for assembly purposes. The arm 35 is pivoted at 37 and a rounded projection 38 on the end opposite eye-bolt 34 bears against a hub 39 of a retard mechanism 40.

The retard mechanism 40 may be a commercially available pneumatic timing head such as the devices manufactured by the Square D Company of Milwaukee, Wis., but altered so as to be noninstantaneously recycling. The mechanism 40 comprises an upper housing 41 and a lower housing 42 held together by screws 43 in such manner that a flexible diaphragm 44 is firmly clamped therebetween to divide the internal cavity into two chambers 45a and 45b. Chamber 45b is connected to chamber 45a by interconnecting passageways 46 and 47. A needle valve 48 is provided at the intersection of the passageways to control the flow of air therethrough. Diaphragm 44 is connected to one end of a shaft 49 by a coupling 50 while the other end of shaft 49 is secured to the hub 39. A bee-hive compression spring 51 is mounted around the shaft 49 between the adjacent faces of hub 39 and the upper housing 41.

As customarily made, the retarded mechanism 40 has a slow advance—rapid return characteristic. Thus if a force is applied to the hub 39 in the direction toward the mechanism, shaft 49 will move inwardly, compressing the spring 51 and moving the diaphragm 44 into chamber 45b. The air in chamber 45b is forced out through passageway 46, the needle valve 48 and passageway 47 to chamber 45a. Opposing the applied force is the resistance of the spring 51 and the resistance to the flow of air through the orifice of needle valve 48 which may be adjusted to vary the time required for a given force to drive the shaft the length of the stroke. When the force is released, spring 51 starts the return stroke and a check valve (not shown), in the coupling 50 opens to allow free transfer of the air from chamber 45a to chamber 45b, thus the return stroke is accomplished virtually instantaneously. For the purposes of the present invention, the check valve is omitted or is permanently fixed in the closed position. Consequently on the return stroke, the air in chamber 45a returns slowly to chamber 45b via the passageways 46, 47 and the needle valve and the rate of the return travel of shaft 49 is therefore of the same order as the forward rate.

The hub 39 has an annular groove 42 which engages one end of a lever 53. The other end of lever 53, which is pivoted at 54, is so positioned as to contact an operating button 55 of a precision switch 56 when the lever 53 is rotated about pivot 54 in the counter-clockwise direction. The switch 56 contains the normally open contact 19. Switch 56, retard mechanism 40 and pivots 37 and 54 for arm 35 and lever 53, respectively, are all permanently mounted on a frame (not shown) which is in turn supported by the housing 24.

The fusing of one or more sprinkler heads (or system leakage) will cause water to flow in riser 22 in the direction of the arrow, in turn causing the vane 25 to be deflected to the position indicated by the dashed lines. The spherical portion 28 of the vane hub 27 rotates around the pivot 26 and causes a similar displacement of the cup 29 and the operating stem 30 as also shown in dashed lines. The linkage spring 33 is immediately extended and thus applies a force through the eye-bolt and nut combination 34–36 to the arm 35, causing clockwise rotation of arm 35 about the pivot 37. The spring force is transmitted by the rounded projection 38 of lever 35 to hub 39 which is thereby caused to move toward the retard mechanism 40, compressing the bee-hive spring 51.

As the diaphragm 44 moves into chamber 45b, the air therein is compressed and therefore resists the driving force. The air, however, escapes from chamber 45b via the passageways 46–47 to chamber 45a at a rate controlled by the setting of needle valve 48. Thus, hub 39 steadily moves toward the retard mechanism 40 and the annular groove 52 around the periphery of hub 39 carries the engaged end of lever 53 forward at the same rate. Lever 53 is thus caused to rotate about pivot 54 and the other end of lever 53, bearing against the operating button 55 of precision switch 56 will ultimately cause the closure of the contact 19.

The closing of contact 19 interconnects loop circuits 12–13 through the conductors 17–18 thereby shunting the impedance element 14 (FIG. 1). The resulting increase in current flow in the electrical network 10 is sufficient to operate the alarm relay 15, which in turn operates the transmitter 16 to generate the desired coded signal in a manner so well known in the art as to require no further description.

If however there should occur some interruption in the flow of water before the contact 19 is closed and which allows the vane 25 to return to the normal position the linkage spring 33 will be relaxed and the driving force will be removed from the hub 39. In the devices of the prior art, such an occurrence would permit the retard mechanism to fly back to the initial position. In the present invention, loss of the driving force allows spring 51 to restore the mechanism; but, as the air from chamber 45a must now return to chamber 45b via the same route because the by-pass valve in coupling 50 has been blocked, the mechanism will restore at a retarded rate governed by the strength of spring 51 and the setting of needle valve 48.

Therefore, if the flow of water is resumed a moment later, the retard mechanism will pick up from some intermediate point of the cycle rather than from the beginning and the ultimate initiation of the alarm signal will not be delayed unduly.

It will be seen that the design of the spring 33 and the actuator arm 35 is important to proper functioning. The basic rate of the retard mechanism is that of the return stroke and is established by spring 51 for a given setting of valve 48. The spring 33 and the location of pivot point 37 of arm 35 must be so designed that the force applied to hub 39 when spring 33 is extended will be slightly greater than twice the force produced by the spring 51 when compressed. The reason for this relationship is that on the forward stroke, a force equal to that of spring 51 is required simply to compress spring 51 and an additional equal amount of force is required to drive the shaft 49 forward at the rate it is driven in the opposite direction by the force of spring 51. The need for the slight excess will be made apparent hereinafter in connection with FIG. 3.

It is also important that the precision switch 56 be of the toggle or positive-acting snap type so that the contact 19 will not close until the lever 53 is near the end of its travel to permit full utilization of the capacity of the retard mechanism 40. Furthermore, the contact 19 should not reopen until the lever 53 has returned appreciably toward the normal position lest a fluctuation occurring at the end of the retard period allows contact 19 to reopen before the alarm relay 15 has had time to actuate the transmitter 16. Such action is of greater importance when the transmitter is provided with a retard mechanism of the instantaneously recycling type because small movements of the lever 53 would then intermittently open and close contact 19 and cause undesirable recycling of the transmitter retard.

Figure 3A:
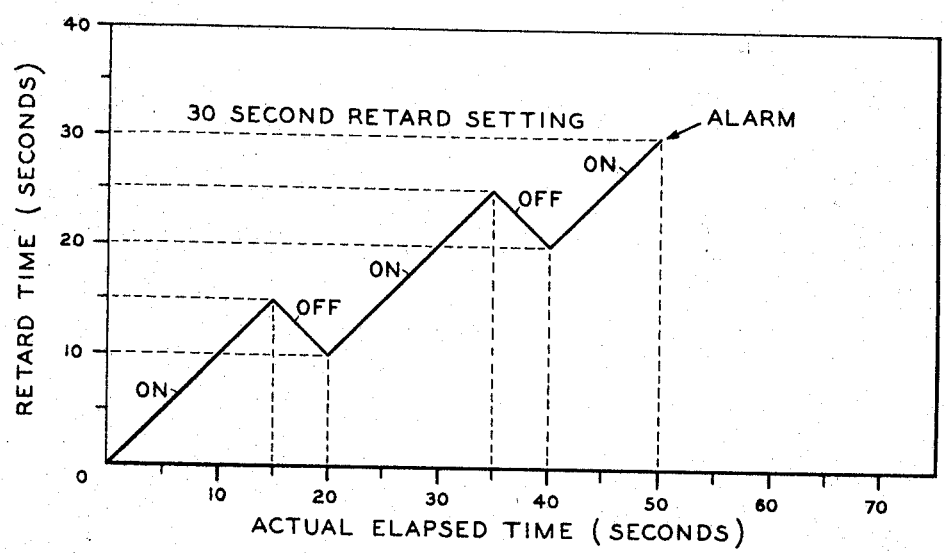
FIG. 3a is a graphical representation illustrating the method of operation of an instantaneously recycling retard mechanism.

The non-instantaneously recycling method of operation of the present invention will be more clearly understood by reference to FIG. 3a wherein an interrupted flow condition is graphically illustrated. In FIG. 3a the abscissa represents the actual time elapsed while the ordinate represents the time "stored" by the retard mechanism at any moment. Assume the retard mechanism has been set for a 30-second period, that water begins to flow at time zero and that the retard mechanism is simultaneously actuated. After 15 seconds, the flow is interrupted. At the moment of interruption, the retard mechanism reverses its travel to return to the original position but moves at the same rate as the forward travel. Flow resumes five second later and the direction of travel again reverses. Therefore after 20 seconds of actual elapsed time, the retard mechanism is at the 10-second point (15 seconds forward less five seconds return). The flow continues for 15 seconds and is again interrupted for five seconds before resuming. At this moment, after 40 seconds of elapsed time, the retard mechanism is at the 20-second point. This time the flow continues for the 10 seconds remaining of the preset 30-second retard period and the alarm signal is transmitted. Consequently, despite two five-second interruptions, the alarm point was reached in a total of 50 seconds of elapsed time.

Figure 3B:
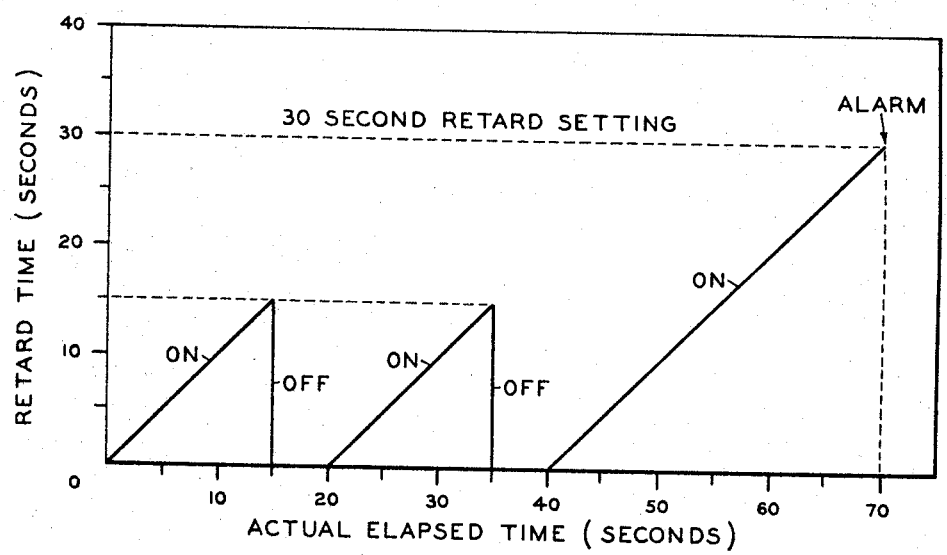
FIG. 3b is a graphical representation illustrating the method of operation of an instantaneously recycling retard mechanism.

FIG. 3b represents in similar manner the response of the conventional instantaneously recycling retard under like circumstances. When the first interruption occurs after 15 seconds, the mechanism returns instantaneously to the original position. The recycling is repeated at the second interruption so that after 40 seconds have elapsed, the mechanism is at the starting point whereas the mechanism of the present invention had accumulated 20 seconds under similar conditions. On the third actuation the mechanism runs to the alarm point, but only if the flow continues uninterrupted for a full 30 seconds. This results in signal transmission after 70 seconds as compared to the 50 seconds provided by the method of the invention.

The above explanation involving but two five-second interruptions is not typical of an actual installation wherein more hydraulic activity would be expected and is intended only to illustrate the method of operation rather than serve as a practical example of working conditions. Furthermore, to simplify the explanation, the return rate of travel has been taken as equal to the forward rate of travel of the retard mechanism. For practical purposes, the forward travel should be slightly greater than the reverse travel as results from the previously mentioned designing of the spring 33 and actuator arm 35 to apply a force to hub 39 somewhat larger than twice the force exerted by spring 51 when compressed. Such provision ensures that under extreme conditions of hydraulic fluctuations the mechanism will ultimately reach the alarm point so long as the "ON" periods exceed the "OFF" periods.

It will be seen that the method of the present invention lies in retarding the return rate of the retard mechanism. Another method of operation is the instant return of the prior art devices which permits dangerous delay in the transmission of alarm signals under interrupted flow conditions. Still another method of operation would be to stop the retard mechanism when an interruption occurred and restart from that point upon the resumption of flow. But so doing would have the undesirable result of accumulating the effect of brief surges over long periods of time and ultimately produce a false alarm.

Those skilled in the art will recognize that the method of the present invention may be practiced to equal advantage with retard mechanisms operating on principles other than pneumatic.

An electrical retard based on charging or discharging a capacitor over a period of time could readily be provided with time constant circuits to control the charge and discharge rates as desired. Such a retard mechanism is described below in connection with FIG. 5. Likewise, thermal retard devices of the bi-metallic type having a heater element could be so designed that the heater would warm and cool at about the same rate. It is, however, unlikely that a thermal retard would be practical due to the difficulties of the design and the well-known effect of ambient temperatures on the time intervals of such devices.

*Pressure-type detector*

Figure 4:
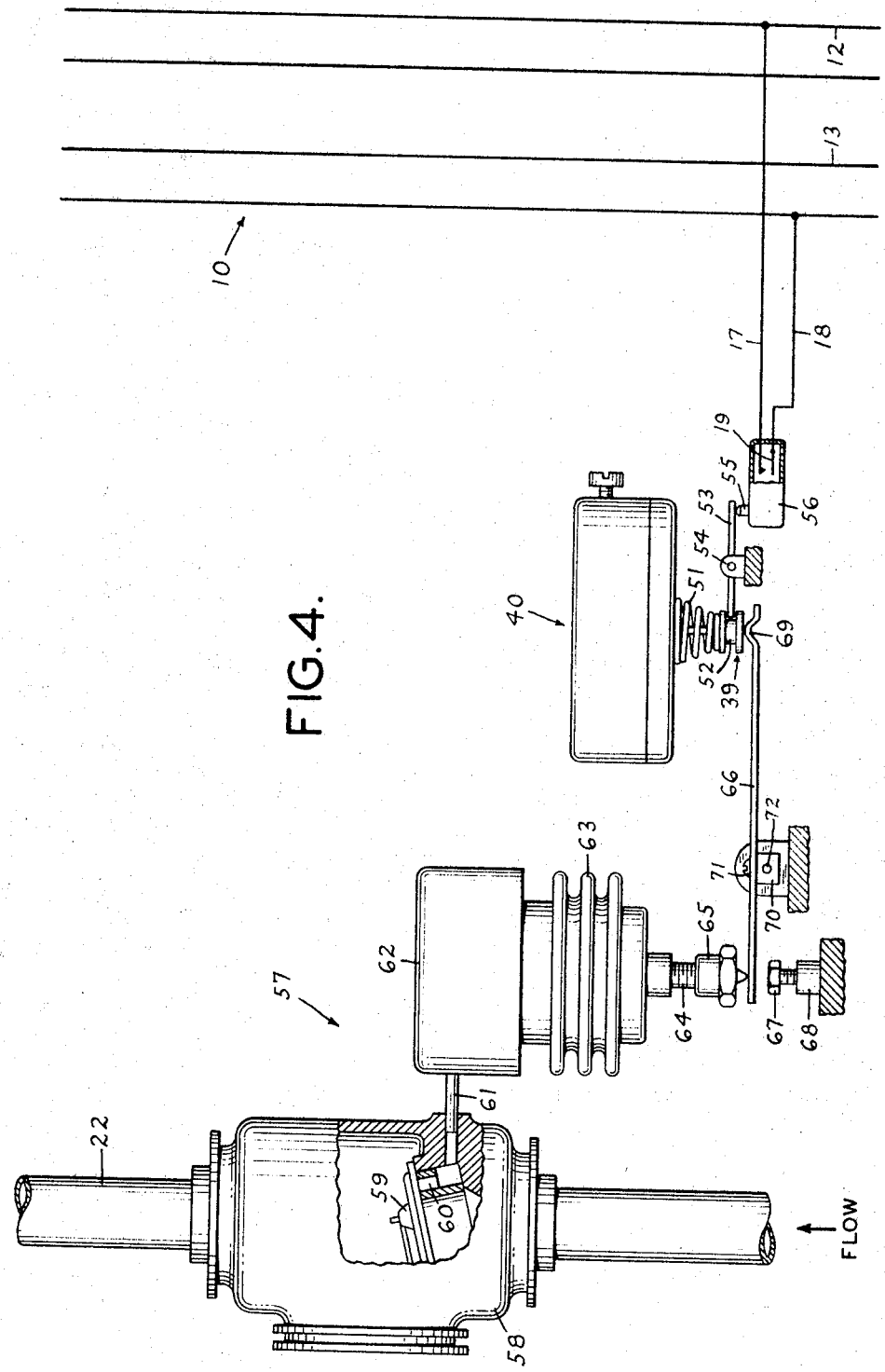
FIG. 4 is a cross-sectional view of a pressure type water-flow detector and the associated retard mechanism embodying the invention.

FIG. 4 illustrates, in distorted proportion, a waterflow detector 57 of the pressure type connected to a check valve 58 in a riser 22 of an automatic sprinkler system. The check valve 58 is actually much larger than the other components shown.

When water flows in the sprinkler system, the check valve clapper 59 is lifted from the seat thereby opening the port 60 and permitting water to flow through conduit 61 to a pressure switch 62 of the conventional bellows type. The movable end of bellows 63 terminates in a threaded stem 64 carrying a bearing tip 65 which is adjacent to an operating arm 66. Directly below the bearing tip 65 on the other side of operating arm 66 is a stop comprising a screw 67 mounted in a solid support 68 which serves to limit the travel of bellows 63. The tip 65 is internally threaded to permit adjustment of the amount of travel required of the bellows before the operating arm is contacted. In like manner, the screw 67 may be shifted to stop the bellows at a desired point.

The operating arm 66 is a flat leaf constructed of a resilient material such as phosphor bronze and having a transverse projection 69 near one end. The arm 66 is secured by screws 71 to a mounting block 70 which is pivoted at 72.

Projection 69 bears against the hub 39 of a retard mechanism 40. Lever 53, pivoted at 54, has one end engaged in the annular groove 52 of the hub 39 and the other end positioned to contact the operating button 55 of percision switch 56. The contact 19 of switch 56 is connected by conductors 17–18 to loop circuits 12–13 respectively. All components following the operating arm 66 may be identical with like items of the vane-operated type shown in FIG. 2 and the same reference numerals have been used. The pressure switch 62, stop support 68, pivot 72, retard mechanism 40, lever 53 and switch 56 may all be mounted on a frame enclosed in a housing supported on the check valve 58 by the conduit 61. The frame and housing have not been shown in order to simplify the drawing.

When bellows 63 is extended as a result of water flowing in riser 22, the bearing tip 65 depresses the adjacent end of arm 66 until stopped by screw 67. The element 66, pivoting slightly at 72, acts as a spring to apply a driving force to the hub 39. The retard mechanism then operates exactly as described hereinbefore, advancing or retreating at the same rate, to ultimately cause lever 53 to operate switch 56 thereby shorting loop circuits 12–13 and transmitting the desired signal.

The design of the operating arm 66 is important since it is subject to the same considerations as was the design of the linkage spring and arm of the vane-type detector; essentially, arm 66 when fully stressed must apply a force to hub 39 which is slightly more than twice the force produced by the bee-hive spring 51 in the compressed condition.

*Electrical retard*

Figure 5:
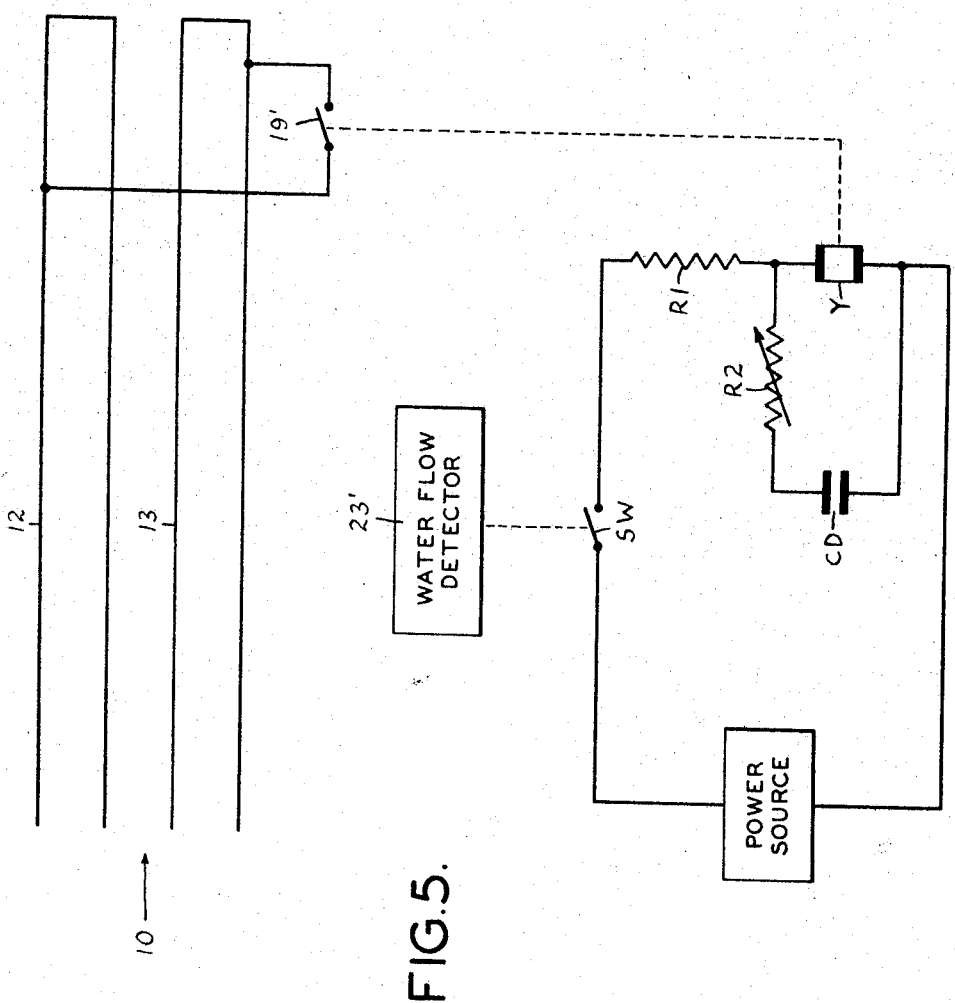
FIG. 5 is a schematic illustration of an electrical retard mechanism embodying the invention.

As mentioned above, the method of the invention is applicable to an electrical retard arrangement. Such an arrangement is illustrated in FIG. 5. In FIG. 5 the loops 12 and 13 of network 10 are arranged to be interconnected by normally open contacts 19' of a relay Y. The coil of relay Y is coupled to an operating power source through a resistor R1 and normally open switch contacts SW.

The switch contacts SW are connected to a waterflow detector 23' which might be, for example, of the vane type as shown in FIG. 2 or of the pressure type as shown in FIG. 4. The arrangement is such that when water-flow is detected the switch SW is closed and when water-flow ceases the switch SW opens.

The series combination of a variable resistor R2 and a capacitor CD is connected across the coil of relay Y. When the switch SW is closed upon occurrence of a flow of water in the system being supervised, operating potential will be applied across resistor R1 and the coil of relay Y. However, relay Y will not be energized immediately because of the presence of capacitor CD. The energization of relay Y will be delayed by a period equal (or proportional) to the charging time constant of capacitor CD, i.e., the sum of the resistances R1 and R2 multiplied by the capacitance of capacitor CD. When relay Y is finally energized, contacts 19' thereof close and result in transmission of an alarm as previously described.

However, if the flow of water ceases and switch SW opens before the relay Y is energized, capacitor CD starts to discharge. The discharging time constant will be equal to the resistance of resistor R2 plus the resistance of the coil of relay Y times the capacitance of capacitor CD. If the value of resistor R1 is the same as the resistance of the coil of relay Y the charging and discharging time constants will be equal. Thus, if switch SW again closes before capacitor CD is fully discharged, less time will be required to energize relay Y than if the capacitor CD were fully deenergized. The operation will be essentially as represented by FIG. 3, but with exponential response rather than linear response.

It is desirable thaat the charging time constant be slightly less than the discharging time constant so that under extreme conditions of hydraulic fluctuations the relay Y will ultimately be energized to transmit an alarm so long as the on-periods exceed the off-periods.

The length of the delay period may be varied by changing the resistance of resistor R2. Such a change will be similar in effect to varying the setting of needle valve 48 in FIG. 2.

While the invention has been described in connection with specific embodiments thereof and in a particular use wherein a number of detectors are connected to a common transmitter, it will be apparent that the retard mechanism could readily be arranged to actuate a transmitter directly through a mechanical or electrical linkage and thus constitute a combined detector-transmitter unit.

What is claimed is:

1. In a fire protection system of the water-flow type having a water-flow responsive device arranged to produce an output in the form of storable energy upon occurrence of a flow of water in said system, the method of signaling the occurrence of a flow of water in said system comprising the steps of:
   (a) delivering said output to an energy absorbing system having a forward response characteristic which retards absorption of said output at a selected rate and a reverse response characteristic which redelivers said output at a retarded rate slightly less than said selected rate upon cessation of said output;
   (b) continuously monitoring the quantity of energy stored in said energy absorbing system; and
   (c) producing an alarm signal indication when the monitored quantity of energy stored in said energy absorbing system reaches a predetermined level.

2. In a fire protection system of the water-flow type having a water-flow responsive device arranged to produce a mechanical displacement output upon occurrence of a flow of water in said system, the method of signaling the occurrence of a flow of water in said system comprising the steps of:
   (a) delivering said output to a resilient energy absorbing system having a forward response characteristic which retards absorption of said output at a selected rate and a reverse response characteristic which redelivers said output at a retarded rate slightly less than said selected rate upon cessation of said output;
   (b) continuously monitoring the quantity of energy stored in said energy absorbing system; and
   (c) producing an alarm signal indication when the monitored quantity of energy stored in said energy absorbing system reaches a predetermined level.

3. In a fire protection system of the water-flow type having a water-flow responsive device arranged to produce an output in the form of storable energy upon occurrence of a flow of water in said system, the method of signaling the occurrence of a flow of water in said system comprising the steps of:
   (a) converting said output to a monitorable quantity having a magnitude proportional to the time duration of said output and storing said quantity;
   (b) continuously monitoring the magnitude of said stored quantity and producing an alarm signal indication when said magnitude of said stored quantity reaches a predetermined level;
   (c) retarding at a first selected rate said conversion of said output to said quantity;
   (d) reducing the magnitude of said stored quantity upon cessation of said output; and
   (e) retarding at a second selected rate said reduction in said stored quantity occurring upon cessation of said output.

4. In a fire protection system of the water-flow type having a water-flow responsive device arranged to produce an output in the form of storable energy upon occurrence of a flow of water in said system, the method of signaling the occurrence of a flow of water in said system comprising the steps of:
   (a) converting said output to a displacement quantity having a magnitude proportional to the time duration of said output and storing said displacement quantity;
   (b) continuously monitoring the magnitude of said stored displacement quantity and producing an alarm signal indication when said magnitude of said stored displacement quantity reaches a predetermined level;
   (c) retarding at a first selected rate said conversion of said output to said displacement quantity;
   (d) reducing the magnitude of said stored displacement quantity upon cessation of said output; and
   (e) retarding at a second selected rate slightly less than said first selected rate said reduction in said stored displacement quantity occurring upon cessation of said output.

5. In a fire protection system of the water-flow type having a water-flow responsive device arranged to produce a mechanical displacement output upon occurrence of a flow of water in said system, the method of signaling the occurrence of a flow of water in said system comprising the steps of:
   (a) converting said output to a mechanical displacement quantity having a magnitude proportional to the time duration of said output and storing said quantity;
   (b) continuously monitoring the magnitude of said stored displacement quantity and producing an alarm signal indication when said magnitude of said stored displacement quantity reaches a predetermined level;
   (c) retarding at a first selected rate said conversion of said output to said displacement quantity;
   (d) reducing the magnitude of said stored quantity upon cessation of said output; and
   (e) retarding at a second selected rate slightly less than said first selected rate said reduction in said stored displacement quantity occurring upon cessation of said output.

6. In a fire protection system of the water-flow type having a water-flow responsive device having an output member arranged to be displaced from a first position to a second position upon occurrence of a flow of water in said system and to be returned to said first position thereof upon cessation of said flow of water in said system, the combination comprising:
   (a) a pivoted arm having a first point thereon at one side of the pivot point thereof disposed in the path of said output member whereby said pivoted arm is pivoted in a forward direction upon occurrence of a flow of water in said system;
   (b) a retarding device having a movable member arranged to be contacted by a second point on said pivoted arm at the opposite side of said pivot point and to be displaced in a forward direction when said pivoted arm is pivoted in said forward direction thereof and to be displaced in a rearward direction when said flow of water ceases whereby said movable member acts on said pivoted arm to pivot the latter in a rearward direction, said retarding device having a pneumatic system acting on said movable member to retard said forward and rearward displacements of said movable member by substantially equal amounts;
   (c) resilient displaceable means arranged to resist forward displacement of said movable member, and, when displaced, to produce rearward displacement of said movable member, the respective spacing between said first and second points on said arm and said pivot point being selected so that the force applied to said movable member by said pivoted arm when the latter is pivoted in a forward direction is slightly greater than twice the force produced by said resilient means when the latter is displaced; and (d) means operatively connected to said movable member to produce an alarm signal indication when the forward movement of said movable member reaches a predetermined position.

7. In a fire protection system of the water-flow type having a waterflow responsive device having an output member arranged to be displaced from a first position to a second position upon occurrence of a flow of water in said system and to be returned to said first position thereof upon cessation of said flow of water in said system, the combination comprising:

(a) a pivoted arm having a first point thereon at one side of the pivot point thereof disposed in the path of said output member whereby said pivoted arm is pivoted in a forward direction upon occurrence of a flow of water in said system;

(b) a retarding device having a movable member arranged to be contacted by a second point on said pivoted arm at the opposite side of said pivot point and to be displaced in a forward direction when said pivoted arm is pivoted in said forward direction thereof and to be displaced in a rearward direction when said flow of water ceases whereby said movable member acts on said pivoted arm to pivot the latter in a rearward direction, said retarding device having a pneumatic system acting on said movable member to retard said forward and rearward displacement of said movable member by substantially equal amounts;

(c) a compression spring arranged to resist forward displacement of said movable member and, when compressed, to produce rearward displacement of said movable member, the respective spacings between said first and second points on said arm and said pivot point being selected so that the force applied to said movable member by said pivoted arm when the latter is pivoted in a forward direction is approximately equal to twice the force produced by said spring when the latter is compressed; and (d) means operatively connected to said movable member to produce an alarm signal indication when the forward movement of said movable member reaches a predetermined position.

References Cited
UNITED STATES PATENTS

| 2,299,941 | 10/1942 | Townsend | 317—141 |
| 2,379,631 | 7/1945 | Finckh | 317—141 |
| 2,876,396 | 3/1959 | Rush et al. | 317—141 |
| 2,966,133 | 12/1960 | Hube | 116—117 |
| 3,091,758 | 5/1963 | Lewis | 340—239 |

JOHN W. CALDWELL, Primary Examiner.

D. K. MYER, Assistant Examiner.

U.S. Cl. X.R.

200—153.8, 81.9; 317—141

UNITED STATES PATENT OFFICE
CERTIFICATE OF CORRECTION

Patent No. 3,448,442 June 3, 1969

Arthur B. Hube

It is certified that error appears in the above identified patent and that said Letters Patent are hereby corrected as shown below:

Column 1, line 59, "intiate" should read -- initiate --. Column 2, line 10, "sugre" should read -- surge --; line 61, "brake" should read -- break --. Column 3, line 9, "waterflow" should read -- water-flow --; line 60, "an instantaneously" should read -- a noninstantaneously --. Column 5, line 11, "retarded" should read -- retard --; line 18, "is" should read -- are --. Column 6, line 67, "second" should read -- seconds --. Column 8, line 15, "percision" should read -- precision --. Column 12, lines 2 and 3, "displacement" should read -- displacements --; line 24, "317-141" should read -- 340-239 --; line 25, "116-117" should read -- 340-239 --.

Signed and sealed this 14th day of April 1970.

(SEAL)
Attest:

Edward M. Fletcher, Jr.

Attesting Officer

WILLIAM E. SCHUYLER, JR.

Commissioner of Patents